May 9, 1933.　　A. J. LOEPSINGER　　1,908,373
METHOD OF MAKING PIPE BENDS OR THE LIKE
Filed March 25, 1931　　2 Sheets-Sheet 1
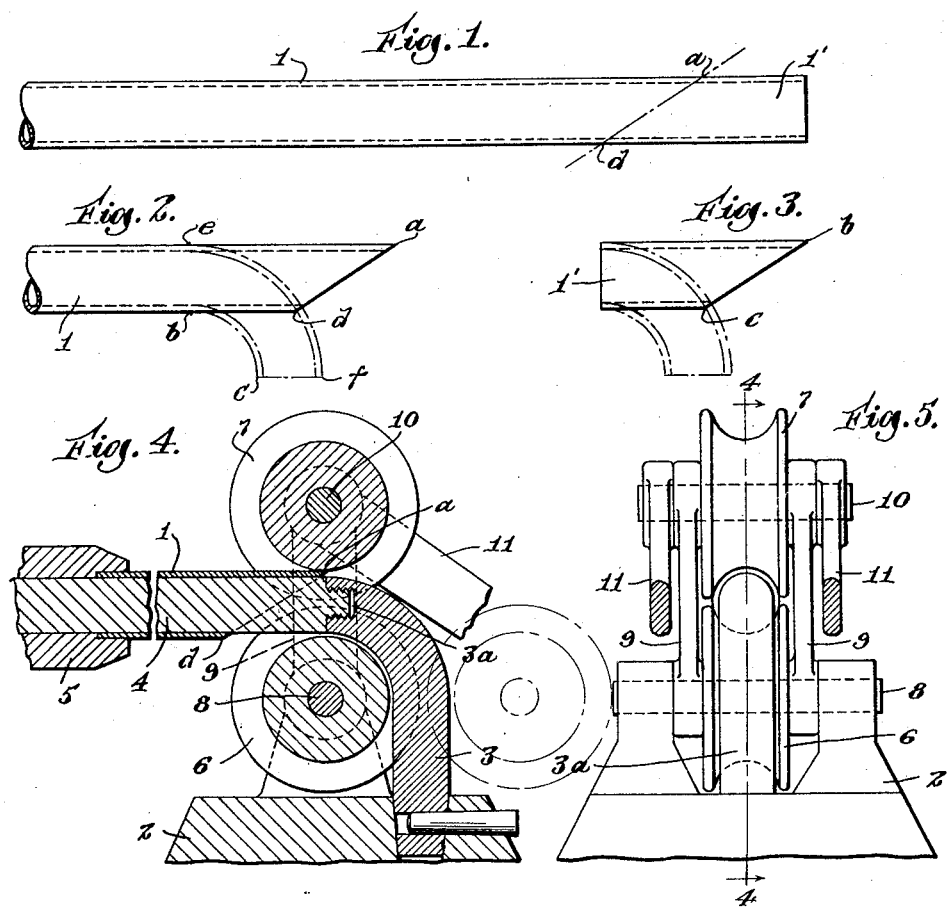
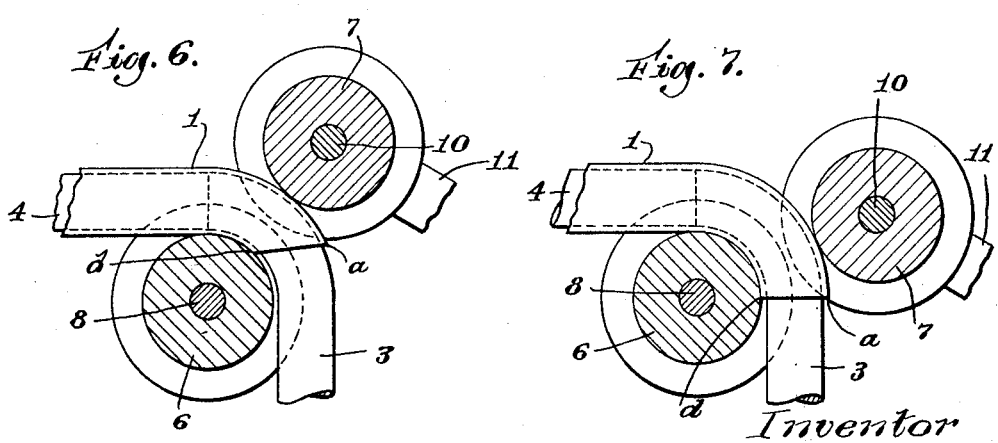
Inventor
Albert J. Loepsinger
by Harry Dexter Peck
Attorney May 9, 1933.  A. J. LOEPSINGER  1,908,373
METHOD OF MAKING PIPE BENDS OR THE LIKE
Filed March 25, 1931   2 Sheets-Sheet 2
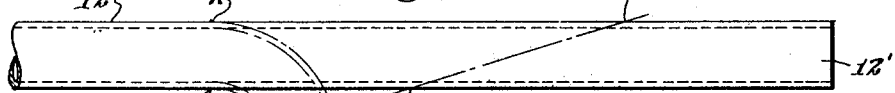
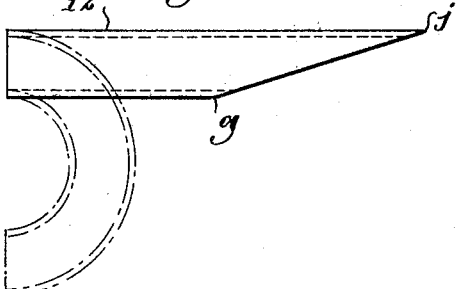
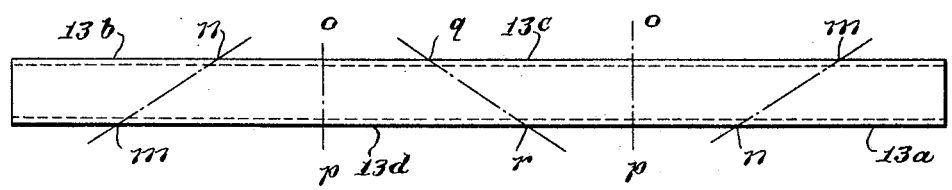
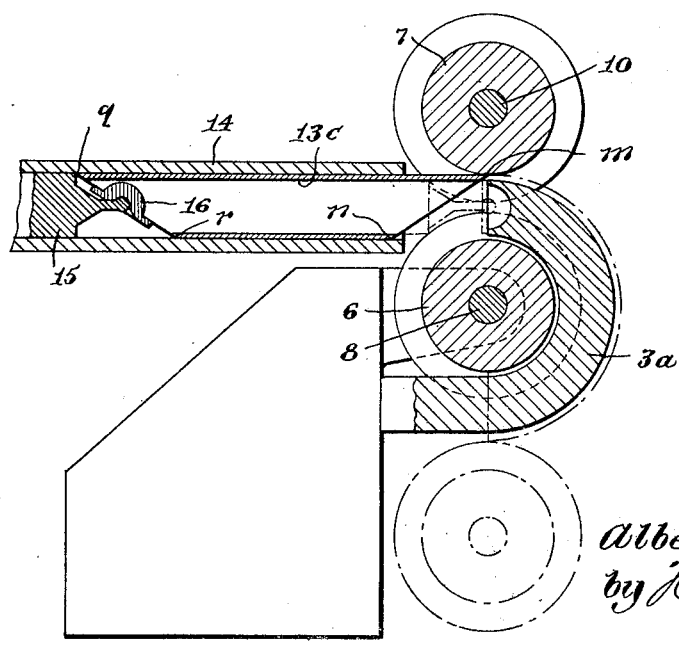
Inventor
Albert J. Loepsinger
by Harry Dexter Peck
Attorney Patented May 9, 1933

1,908,373

UNITED STATES PATENT OFFICE

ALBERT J. LOEPSINGER, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE

METHOD OF MAKING PIPE BENDS OR THE LIKE

Application filed March 25, 1931. Serial No. 525,166.

This invention relates to an improved method of making pipe bends or the like.

Heretofore in bending pipes or tubes, the wall at the inner side of the bend has been thickned by compression or contraction, and in many cases caused to bulge or wrinkle, while the wall at the outer side has been weakened by thinning due to the stretching or attenuation thereof. It has been proposed to avoid these undesirable results by simultaneously thinning the inner wall of the pipe as the bending occurs but this has been accomplished only by an expansion of the pipe with resulting different diametrical size of the bend from that of the original pipe.

The principal object of this invention is to produce pipe bends having the same diametrical and circumferential size as the pipe from which the bend is made, and having the same uniform thickness of wall as in the original pipe. It is a feature of the invention that its method may be applied in making bends integrally at the end of a pipe as well as in forming bends per se.

The best mode in which I have contemplated applying the principles of my invention is illustrated in the accompanying drawings but it is intended that the patent shall cover by suitable expression in the appended claims whatever features of patentable novelty exist in the invention disclosed.

In the accompanying drawings:

Figure 1 is a side elevation of a single pipe length with a dot-and-dash transverse line indicating how it should be cut to provide for the formation of a 90° bend on the end of the pipe length, as well as a 90° bend per se;

Figure 2 is a similar view of the pipe after being cut with the bend to be formed illustrated in dot-dash outline;

Figure 3 is a similar view of the portion of the pipe of Figure 1 that is cut off, showing in dot-dash outline the bend to be formed therefrom;

Figure 4 is an elevation in section as on line 4—4 of Figure 5 of apparatus adapted for making the pipe bends in accordance with this invention;

Figure 5 is an end elevation of the apparatus of Figure 4;

Figures 6 and 7 are views similar to Figure 4 showing the relative positions of the bend and parts of the apparatus at an intermediate and at the final stage of the bending;

Figure 8 shows how a pipe may be cut to provide a half bend, the latter being suggested in dot-dash outline;

Figure 9 shows the cut-off end of the pipe of Figure 8, with the bend to be formed therefrom in dot-dash outline;

Figure 10 illustrates another manner of cutting a pipe to form both quarter-bends and half-bends; and Figure 11 shows apparatus for making half bends.

In making a quarter-turn bend by the improved method, a pipe 1 of the same diametrical and circumferential size as the desired bend is cut cross-wise or slant-wise on a plane passing through points $a$ and $d$. In determining the location of these points it is preferable to lay off point $a$ a distance from the end of the pipe equal to the length of the innermost element of the proposed bend, that is the element $bc$ shown in Figure 2. Point $d$ on the opposite side of pipe 1 is similarly spaced from the end a distance corresponding to the length of the outermost element $ef$ of the bend represented in Figure 2. The pipe is then cut on a plane angularly disposed to the axis of the pipe and passing through points $a$ and $d$. Both the cut off end 1', as well as the new undercut end of the pipe can now be bent to form respectively a right-angled bend per se, and a quarter-bend integral with the pipe.

In Figures 4—7 apparatus by which the bending may be accomplished is suggested. Removably mounted on the base 2 is a mandrel 3 curved in the shape of the bend desired. The diametrical and circumferential size of this mandrel is approximately that of the inside of the pipe, there being provision for the pipe to slide over the mandrel. The latter is arranged as shown in Figure 4 and is preferably provided at its free end with a tapped socket 3a to receive the threaded stud of another mandrel 4 on which the pipe 1 or the cut-off end 1' is placed. Slidably arranged on this mandrel is a chuck 5 to which power may be applied to force the pipe 1, or its cut off end 1', along the mandrel 4 and onto the curved mandrel 3.

Means in the form of complementary rollers 6 and 7 aid the pipe in assuming the form of a bend. Roller 6 is pivotally mounted on the fixed shaft 8 on which is similarly mounted arms 9 which carry the oscillating shaft 10. Roller 7 is journaled on this latter shaft and is caused to swing back and forth between the full line and dot-dash line positions shown in Figure 4, being actuated by links 11 whose actuating means is not shown.

As the pipe moves forward, or to the right as seen in Figure 4, the roller 7 in its oscillations causes the leading point $a$ to follow along the outermost element of the mandrel 3 and in due course as the movement of the pipe continues, point $d$ of the pipe similarly follows the innermost element of the mandrel. In Figure 6 the relative positions of the points $a$ and $d$ with respect to the mandrel are shown at an intermediate stage of the pipe's progress and in Figure 7 the final position of these points is seen, with the bend fully formed. The chuck 5 and mandrel 4 are then withdrawn from the pipe, mandrel 3 is released from the base 2, and after removal of the pipe and mandrel 3 from the rollers, this mandrel is also withdrawn from the bend. Thus a quarter-turn bend may be formed on the end of a pipe, and by operating on the cut-off end 1', a quarter-turn bend per se may be made.

Figure 8 represents how a pipe may be cut to produce a half-turn bend on the pipe 12, and a similar return bend per se. As in the case of a quarter turn bend, the point $g$ is located at a distance from the end of the pipe corresponding with the length of the innermost element $hi$ of the bend to be formed, and the point $j$ is similarly located, its distance from the end of the pipe being that of the element $kl$ of the proposed bend. With the end 12' cut off along the line $gj$, a half-turn bend may be formed on the pipe 12 (indicated in Figure 8) and a similar bend shaped from the cut-off end 12', (indicated in Figure 9). Figure 10 suggests how a pipe 13 may be cut into sections adapted to be made into both quarter-turns and half-turns. Sections 13$a$ and 13$b$ at the ends of the pipes are to be cut on the lines $mn$ the points $m$ and $n$ being located in the same way as were points $a$ and $d$ of Figure 1. These sections 13$a$ and 13$b$ will provide quarter turns and it is now obvious that if the pipe were also cut transversely as on lines $op$, other sections would be provided for making other quarter-turns. Instead of cutting the pipe thusly, it may be severed on the line $qr$. The point $q$ of this line is twice the distance from point $m$ as the point $n$ is from the end of the pipe, and distance $nr$ is likewise twice the distance from the pipe end to point $m$. As shown in Figure 10, the section 13$d$ of the pipe is the same as section 13$c$. It is to be understood that many such sections could be formed depending upon the length of the pipe and size of the bends to be made.

Figure 11 illustrates how a section like 13$c$ of pipe 13 could be bent to form a half-turn. In the apparatus here suggested the mandrel 3$a$ makes a half-turn around the roller 6 on the fixed shaft 8. The oscillating roller 7 in this arrangement moves from the full line position shown to the diametrically opposite dot-dash line position. The section of pipe 13$c$ is placed within a fixed sleeve 14 through which a plunger 15 can be driven to force the pipe section along the mandrel 3$a$. At the end of this plunger is a push-plate 16 pivotally mounted so as to adapt itself to the angular change of the end of the pipe section as it bends around the mandrel, the final position of this push plate being indicated by dotted outline above the roller 6. At the completion of the forward stroke of the plunger 15 the section 13$c$ will have been completely forced onto the mandrel 3$a$ and shaped to a half-turn.

If the half-turn is to be made on the end of the pipe, the latter after being cut along line $g$—$j$ as in Figure 8, is forced onto mandrel 3$a$ in much the same manner as was the pipe 1 in Figure 4. Likewise, the cut-off end 12' of pipe 12 can be forced along mandrel 3$a$ to make a half-turn bend per se.

It is of course clear that in bending large-sized pipes provision would be had for heating them both prior to the bending and, if necessary, while the material is moving around the mandrels. Such provision is well-known and need not be shown here in detail. Among the advantages following from the improved method is the making of a bend of the exact diametrical and circumferential size as the original pipe, without change or deformation of the pipe walls except of course as the latter is curved to make the bend. Another advantage resides in the making of a bend on the end of a pipe length, thereby avoiding one of the two welded joints heretofore necessary when a pipe bend is inserted in a pipe line. And another advantage is found in the saving of material for whenever a pipe-length is cut to form a bend thereon, the cut-off end may also be utilized to make a bend per se. It is also evident that the steps of the process are very simple and can be carried out with marked rapidity, thereby effecting appreciable economy in the time and labor items of making pipe bends.

I claim:

1. The method of making a pipe bend or the like which comprises shaping a pipe so that one end defines a plane angularly disposed with respect to the axis of the pipe and so that the extent of projection of one side of the pipe beyond the other side is equal to the difference in length between the outermost and innermost elements of the bend to be formed, and then forcing the said end of the pipe along a fixed mandrel having the curvature of the desired bend and simultaneously applying external pressure to the said end by oscillating a roller in contact with said end.

2. The method of making a pipe bend or the like which comprises forming a section of pipe so that one end thereof defines a plane transversely perpendicular to the axis of the pipe section and the other end thereof defines a plane angularly disposed with respect to said axis, the longer side of said section being equal to the outermost element of the bend to be formed and the shorter side of said section equal to the innermost element of the said bend; and then forcing said prepared section along a fixed mandrel having the curvature of the desired bend and moving a roller against the longer side of said section and permitting said shorter side to contact with a complementary roller.

3. The method of making a pipe bend or the like which comprises cutting a pipe on a plane angularly disposed with respect to the axis of the pipe so that the extent of projection of one side of the pipe beyond the other side is equal to the difference in length between the outermost and innermost elements of the bend to be formed, and then forcing the cut end of the pipe along a fixed mandrel having the curvature of the desired bend with the longer side of the pipe on the outer side of the mandrel; and moving a roller back and forth in contact with the longer side of the pipe as it progresses along the mandrel.

4. The method of making a bend on a pipe which comprises cutting one end of the pipe at an angle to its axis so that one side thereof will extend beyond the other side thereof a distance equal to the difference in length between the outermost and innermost elements of the bend to be formed; and then forcing said cut end of the pipe along a fixed mandrel having the curvature of the desired bend and permitting the pipe to contact with a roller which is rotatable about the axis of curvature of the bend, and moving a roller along the pipe in a circular path at constant distance from the said axis until the leading end-face of the pipe lies in a plane transversely perpendicular to the axis of the bend at said face.

5. The method of making a half-turn bend which comprises cutting a pipe to form a section whose end faces lie in converging planes equally disposed angularly with respect to the axis of the pipe, the length of the longer side of said section being equal to the length of the outermost element of the bend to be formed and the length of the shorter side being equal to the length of the innermost element of said bend; and then forcing said section along a fixed mandrel having the curvature of the desired bend, permitting the shorter side of the pipe to contact with a roller rotatable about the axis of curvature of said bend and pressing a roller against the longer side of the pipe to apply force thereto, until said end faces are in the same diametrical plane.

Signed at Providence, Rhode Island, this 23rd day of March, 1931.

ALBERT J. LOEPSINGER.